(12) United States Patent
Davidson (10) Patent No.: US 7,457,717 B2
(45) Date of Patent: Nov. 25, 2008

(54) SYSTEM FOR TROUBLE SHOOTING AND VERIFYING OPERATION OF SPARE ASSETS

(75) Inventor: Tracy R. Davidson, Wichita Falls, TX (US)

(73) Assignee: The Boeing Company, Irvine, CA (US)

( * ) Notice: Subject to any disclaimer, the term of this patent is extended or adjusted under 35 U.S.C. 154(b) by 360 days.

(21) Appl. No.: 11/347,401

(22) Filed: Feb. 3, 2006

(65) Prior Publication Data

US 2007/0185678 A1   Aug. 9, 2007

(51) Int. Cl.
| | | |
|---|---|---|
| G01R 27/28 | (2006.01) |
| G01R 31/00 | (2006.01) |
| G01R 31/14 | (2006.01) |
| G01R 31/28 | (2006.01) |
| G06F 19/00 | (2006.01) |
| G06F 17/50 | (2006.01) |
| G06F 11/00 | (2006.01) |
| G06F 9/44 | (2006.01) |
| G05B 19/18 | (2006.01) |
| G06G 7/48 | (2006.01) |

(52) U.S. Cl. .............................. 702/120; 700/3; 703/3; 703/6; 703/14; 714/37; 714/41; 714/46; 714/741; 716/4; 717/135

(58) Field of Classification Search ................ 700/3, 700/17, 83; 702/117, 119, 120, 124, 126; 703/3, 4, 7, 13, 14, 15, 23, 24, 25, 28; 714/25, 714/32, 33, 38, 40, 41, 46, 24, 724, 733, 714/738, 741; 716/1, 4, 5; 73/866.4; 434/29, 434/219; 717/124, 134, 135
See application file for complete search history.

(56) References Cited

U.S. PATENT DOCUMENTS

| | | | | |
|---|---|---|---|---|
| 4,167,821 A | * | 9/1979 | Gibson et al. ............... 434/219 |
| 4,463,605 A | * | 8/1984 | McDowell et al. .......... 73/866.4 |
| 4,817,093 A | * | 3/1989 | Jacobs et al. ................ 714/728 |
| 6,158,031 A | * | 12/2000 | Mack et al. .................. 714/724 |
| 6,522,985 B1 | * | 2/2003 | Swoboda et al. ............ 702/117 |
| 6,539,522 B1 | * | 3/2003 | Devins et al. .................. 716/5 |
| 6,602,735 B2 | * | 8/2003 | Shyu ........................... 438/111 |
| 6,735,543 B2 | * | 5/2004 | Douskey et al. ............. 702/120 |
| 6,876,942 B2 | * | 4/2005 | Hagerott et al. ............. 702/120 |
| 7,257,521 B2 | * | 8/2007 | Hashima et al. ................ 703/7 |
| 2002/0183995 A1 | * | 12/2002 | Veitch et al. .................... 703/7 |
| 2003/0004699 A1 | * | 1/2003 | Choi et al. ..................... 703/14 |
| 2003/0025490 A1 | * | 2/2003 | Chen ........................... 324/112 |
| 2005/0256662 A1 | * | 11/2005 | Alder .......................... 702/119 |
| 2007/0168745 A1 | * | 7/2007 | Alam et al. .................... 714/38 |

* cited by examiner

*Primary Examiner*—Crystal J Barnes Bullock
(74) *Attorney, Agent, or Firm*—Weiss & Moy, P.C.

(57) ABSTRACT

A system for testing components of a simulator has a slave device. A master controller is coupled to the slave device. The master controller transmits chip select and data signals to the slave device for testing a component of the simulator. A computer system is coupled to the master controller. The computer system displays at least one image of a control panel. A cursor of the computer system is placed on a desired component on the at least one image of the control panel. A test signal from the computer system is sent to the master controller for testing the component of the simulator.

13 Claims, 8 Drawing Sheets

SYSTEM FOR TROUBLE SHOOTING AND VERIFYING OPERATION OF SPARE ASSETS

BACKGROUND OF THE INVENTION

1. Field of the Invention

The present invention relates generally to an aircraft simulator, and more particularly, to a system and method for trouble shooting and verifying the operation of spare assets of an aircraft simulator.

2. Background Information

Flight simulators are used to try and replicate, or simulate, the experience of flying an airplane as closely and realistically as possible. Flight simulators are extensively used by the aviation industry and the military for pilot training. Most modern flight simulators are not used so much as to train pilots on how to fly aircraft as they are to familiarize flight crews in normal and emergency operating procedures. Using simulators, pilots are able to train for situations that they are unable to safely do in actual aircraft. These situations include, but are not limited to, loss of flight surfaces and complete power loss.

There are many different types of flight simulators. Flight simulators range from the common video game that may be bought at a local electronic store to small enclosures built to replica the inside of a cockpit. More complex flight simulators include full-size cockpit replicas mounted on hydraulic (or electromechanical) actuators, controlled by state of the art computer technology.

When different modules of a flight simulator experience problems, it is difficult for a simulator technician to troubleshoot or verify operation of a fixed or replacement module other than to install the fixed or replacement module in the simulator. Presently, there is no way for technicians to verify operation of the modules from the bench setup. This problem exists due to the fact that there generally is not a simulator or cockpit in the shop hooked up to the hot spare system to allow the technicians to test the fixed or replacement module.

Therefore, it would be desirable to provide a system for troubleshooting and verifying operation of simulator components that overcome the above problems. The system must be able to troubleshooting and verifying operation of simulator components other than by installing the component in the simulator.

SUMMARY OF THE INVENTION

A system for testing components of a simulator has a slave device. A master controller is coupled to the slave device. The master controller transmits chip select and data signals to the slave device for testing a component of the simulator. A computer system is coupled to the master controller. The computer system displays at least one image of a control panel. A cursor of the computer system is placed on a desired component on the at least one image of the control panel. A test signal from the computer system is sent to the master controller for testing the component of the simulator.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
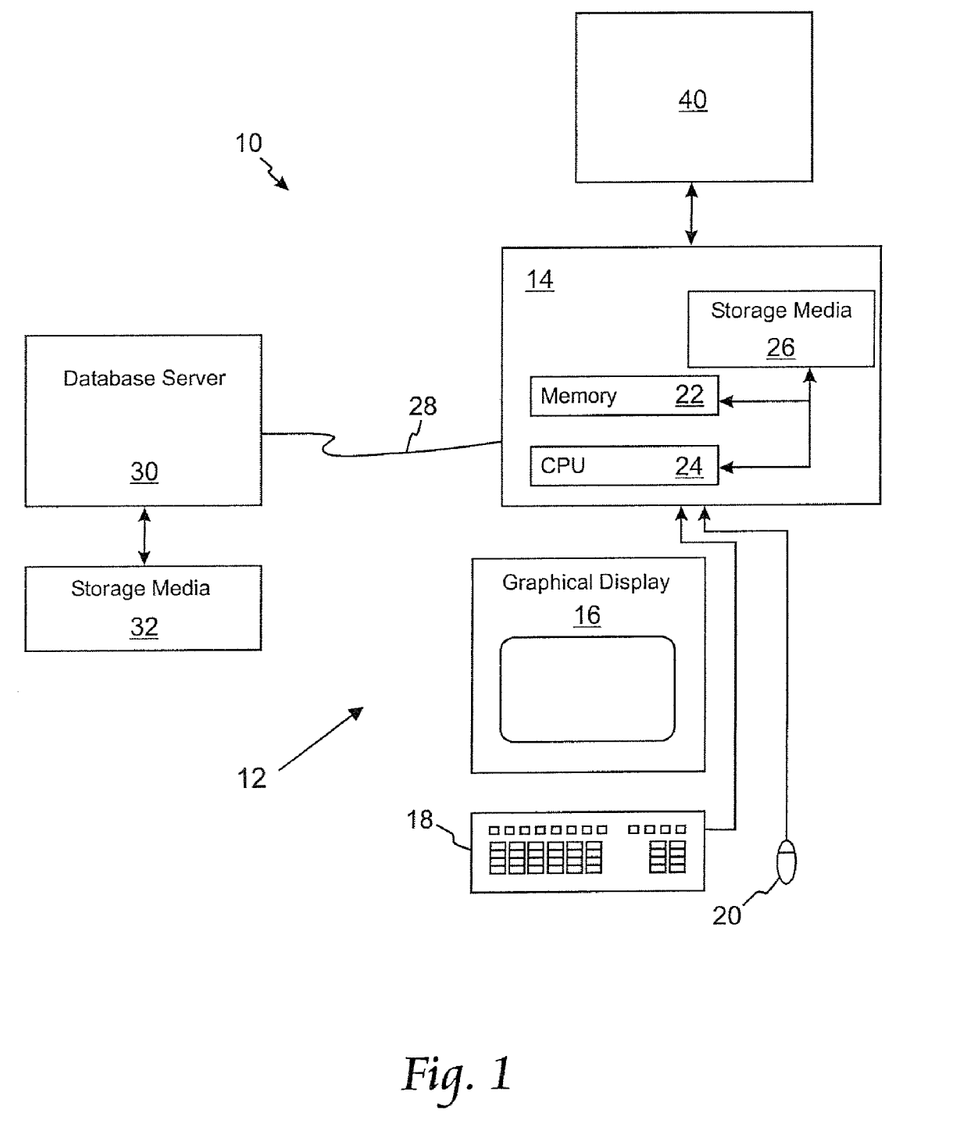
FIG. 1 is a simplified block diagram of a system for trouble shooting and verifying the operation of spare assets of an aircraft simulator.

Referring to FIG. 1, a system 10 for trouble shooting and verifying the operation of spare assets of an aircraft simulator is shown. The system 10 uses a computer system 12. The computer system 12 will have a processor unit 14 and a display 16. Input devices are coupled to the processor unit. The input devices may be a keyboard 18, a mouse 20 and the like. Through the execution of program instructions forming a computer program product within the computer system 12, signals are sent to and from a test circuit 40 to verifying the operation of a desired asset of the aircraft simulator.

The program instructions may be located within a memory 22 of the processor unit 14 and executed by a central processing unit 24 (CPU). Any data stored from the running of the program instructions such as test results and the like may be stored entirely within a storage media 26 and/or the memory 22. Alternatively, the computer system 12 may be coupled via a connection 28 to a network such as a local-area network (LAN), wide-area network (WAN) or the Internet. The connection 28 may be a wired connection, a wireless connection, or the like. In a network implementation, the program instructions may be located within a database server 30. Any data stored such as test results and the like may be stored in a storage media 32 coupled to the database server 30.

Figure 2:
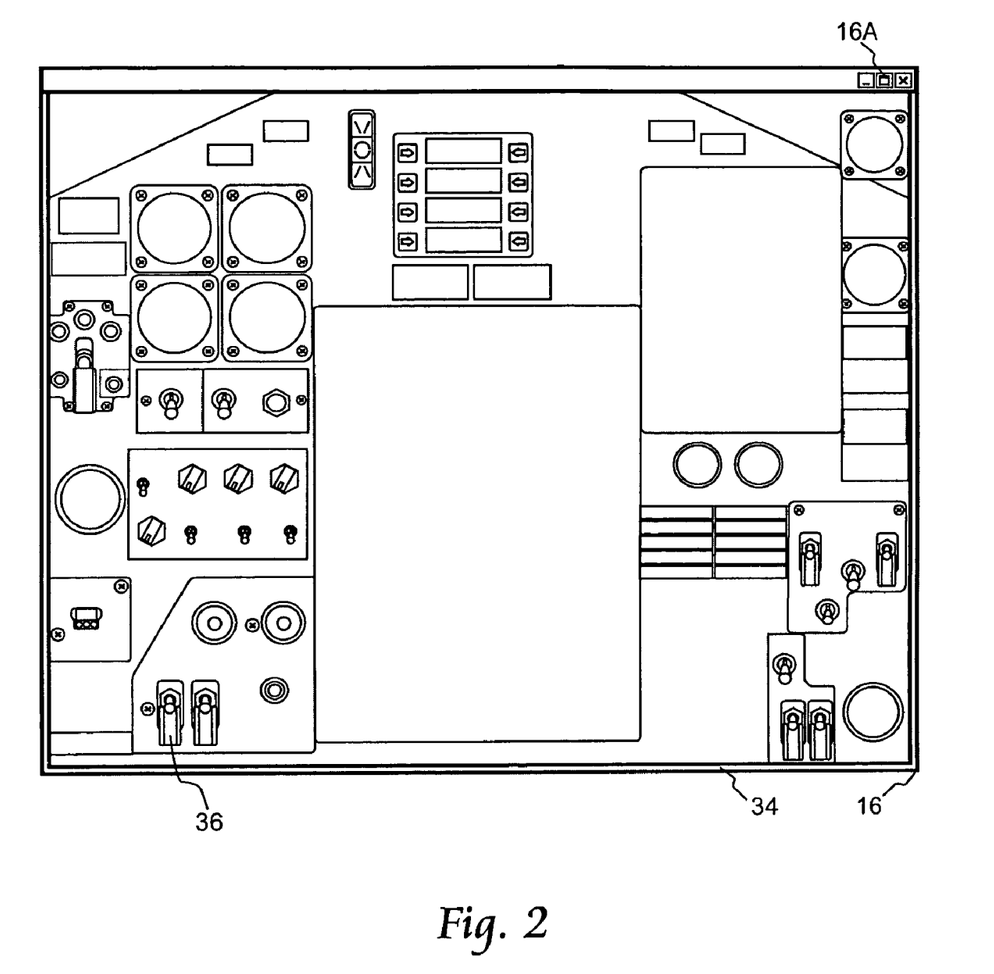
FIG. 2 is a screen view from a computer system forming part of the present invention.

Referring now to FIGS. 1 and 2, one or more graphical images 34 will be stored in the memory 22 or the database server 30. Each graphical image 34 will represent one or more views of a cockpit control panel of an aircraft the simulator represents. A graphical image 34 will be displayed as a window 16A on the display 16. Each graphical image 34 will be divided into a plurality of sections. Each section will represent a different component 36 on the control panel of the aircraft such as a switch, knob, push button, or the like. The listing of the above is given as an example and should not be seen as to limit the scope of the present invention.

By moving an input device such as a key on the keyboard 18 or the mouse 20, a cursor will move on the display 16 and hence on the graphical image 34 shown on the display 16. When the cursor is placed on a desired component 36 on the graphical image 34 shown on the display 16, a user may push a button on the I/O device to simulate activating the component 36. The pushing of the button on the I/O device will send a test signal from the processing unit 14 to the test circuit 40 that simulates activation of the desired component 36. The test signal will indicate that a desired asset of the aircraft simulator coupled to the test circuit 40 is operating properly.

Figure 3:
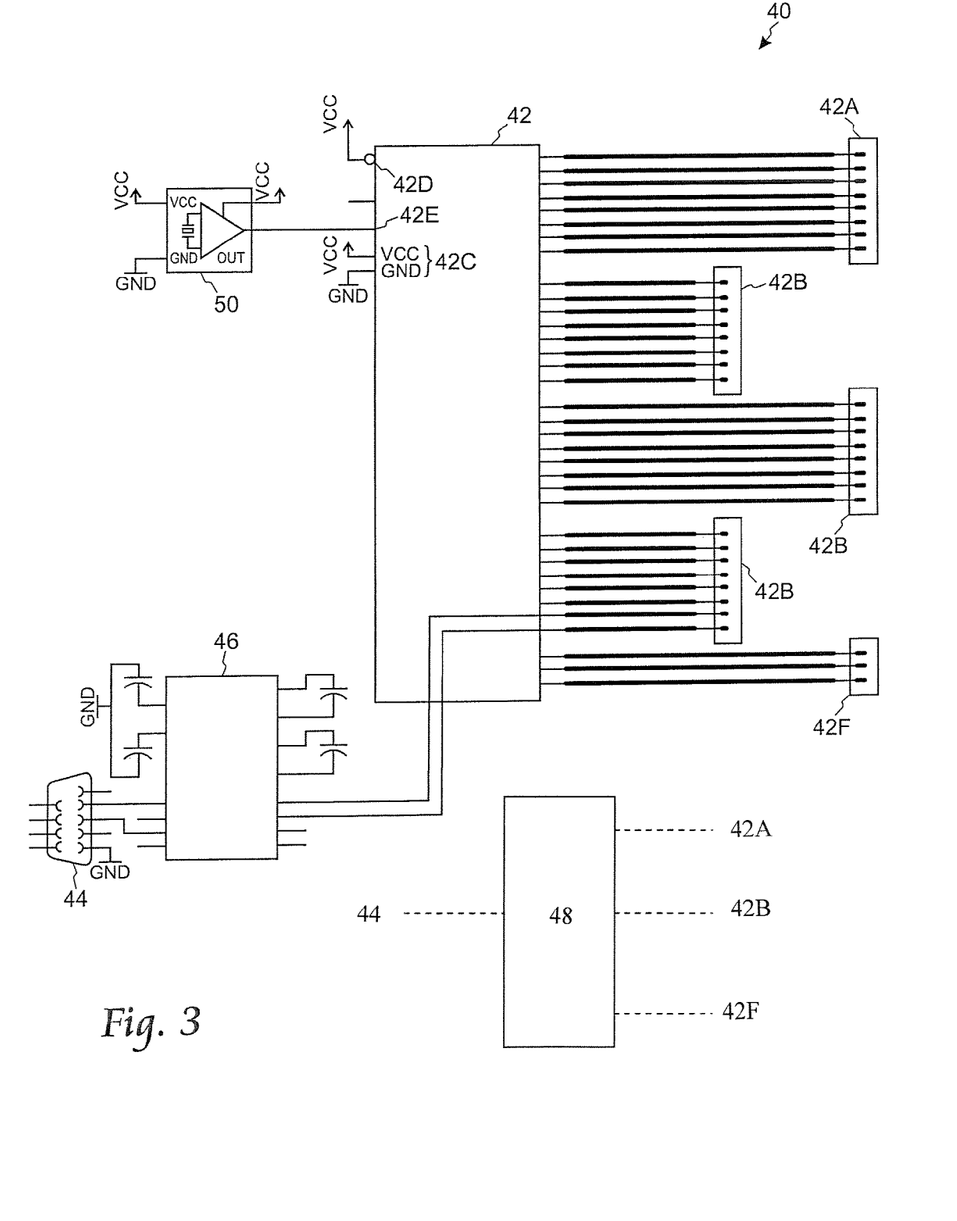
FIG. 3 is a simplified schematic of the master controller microprocessor forming part of the present invention.

Referring now to FIG. 3, a simplified functional block diagram of the test circuit 40 is shown. The test circuit 40 may be used to test different digital or analog inputs or output devices. The test circuit 40 is designed to handle 256 or more digital I/O devices and 64 or more analog I/O devices based on the set-up of the test circuit 40.

The test circuit 40 has a connector 44. The connector 44 allows the test circuit 40 to be coupled to the computer system 12 so that test signals from the computer system 12 may be sent to the test circuit 12. In the embodiment depicted in FIG. 3, the connector 44 is a multi-pin serial port connector. However, the serial port connector is only given as an example and should not be seen as to limit the scope of the present invention. The test circuit 40 may be coupled to the computer system 12 in different manners without departing from the spirit and scope of the present invention.

The connector 44 is coupled to a voltage converter 46. A serial port uses a different set of levels to transmit and receive with. To connect the serial port from the computer system 12 to the test circuit 40 one must convert these levels from one spec to another. The voltage converter 46 will take the RS-232 levels in from the computer system 12 and convert them to logic levels for the test circuit 40. It will also take logic levels out of the test circuit 40 and convert them to RS-232 levels for the computer system 12.

The system 10 may use different types of communication standards. In accordance with one embodiment, the system 10 uses the RS-232 communication standard which allows for data transmission from one transmitter to one receiver at data rates up to 20K bits/second and short distances up to 50 feet at the maximum data rate. The RS-232 signals are represented by voltage levels with respect to a system common (power/logic ground). The "idle" state has the signal level negative with respect to common, and the "active" state has the signal level positive with respect to common.

Figure 4:
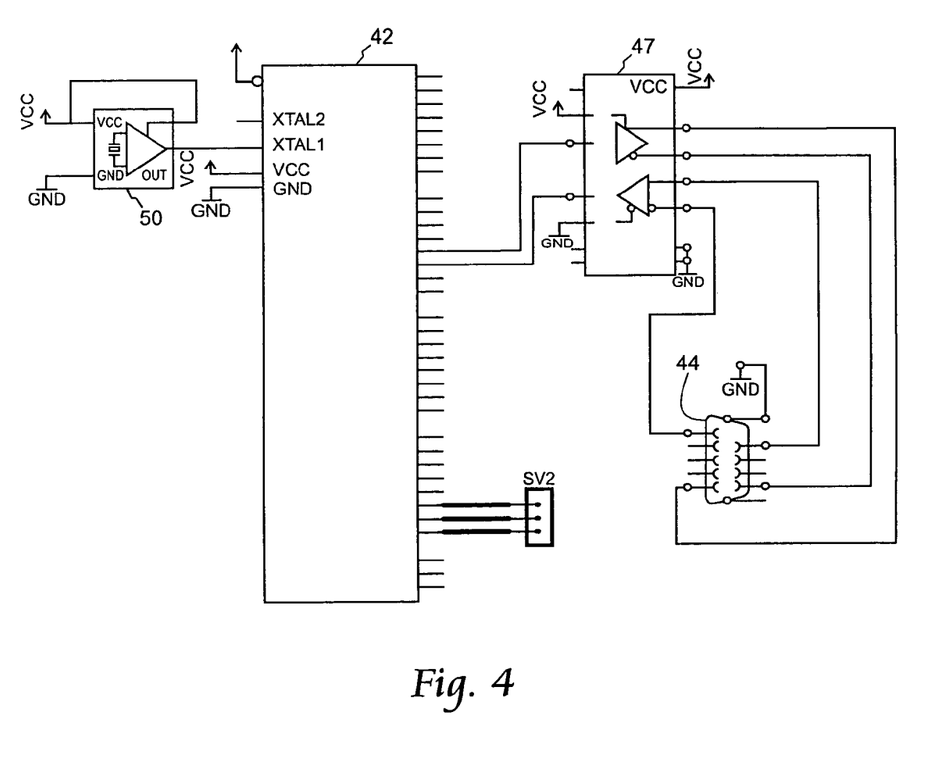
FIG. 4 is a simplified schematic of the master controller microprocessor with an RS-422 interface.

The system 10 may also use an RS-422 communication standard. RS-422 (was designed for greater distances and higher Baud rates than RS-232. Data rates of up to 100K bits/second and distances up to 4000 feet may be accommodated with RS-422. RS-422 is also specified for multi-drop (party-line) applications where only one driver is connected to, and transmits on, a "bus" of up to 10 receivers. As shown in FIG. 4, the system 10 is designed to use an RS-422 communication standard. In order to allow RS-422 communications, the connector 44 is coupled to a differential bus transceiver 47. The differential bus transceiver 47 allows for bidirectional data communication on balanced multipoint bus transmission lines. The differential bus transceiver 47 will convert commands from the computer system 12 to the master controller 42 to RS-422 for MFD simulation.

Referring back to FIG. 3, test signals from the computer system 12 are sent to a master controller 42. The master controller 42 communicates with the computer system 12 through the connector 44. The master controller 42 will process the instructions from the computer system 12 and send out signals via a plurality of pin connections. In the embodiment depicted in FIG. 3, the master controller 42 is divided in a plurality of different pin sets. The master controller 42 has a first set of pins 42A which are used to send chip select signals. The chip select signals will enable or disable the slave devices 48 coupled to the master controller 42. Thus, the chip select signals allow the master controller 42 to initiate control of the slave devices 48. In general, there is one slave device 48 for each type of input or output (analog and digital). While FIG. 3 shows pins 42A as the chip select pins, other pins may be used as chip select pins without departing from the spirit and scope of the present invention. The master controller 42 will also have at least another set of pins 42B which are used to transmit and receive data. These pins 42B are used to send and receive test data to and from the different slave devices. The slave devices will normally not be selected and will therefore present a high impedance to the pins 42B. Upon recognizing a chip select, the slave devices will enable their communication pins and have priority on the pins 42B. Pins 42B are also a RS-232 standard and may or may not implement the level converter 46 due to the slave and master already transmit and receive compatible logic levels.

The master controller 42 has power and ground pins 42C. The power and ground pins are coupled to a voltage supply and ground respectively. The master controller 42 may have a reset pin 42D. The reset pin 42D when activated will set the master controller 42 back to a preset state. An oscillator 50 is coupled to a timing pin 42E of the master controller 42. The oscillator 50 allows the master controller 42 to run at a predictable speed to give a meaningful timing method to the system 10.

Figure 5:
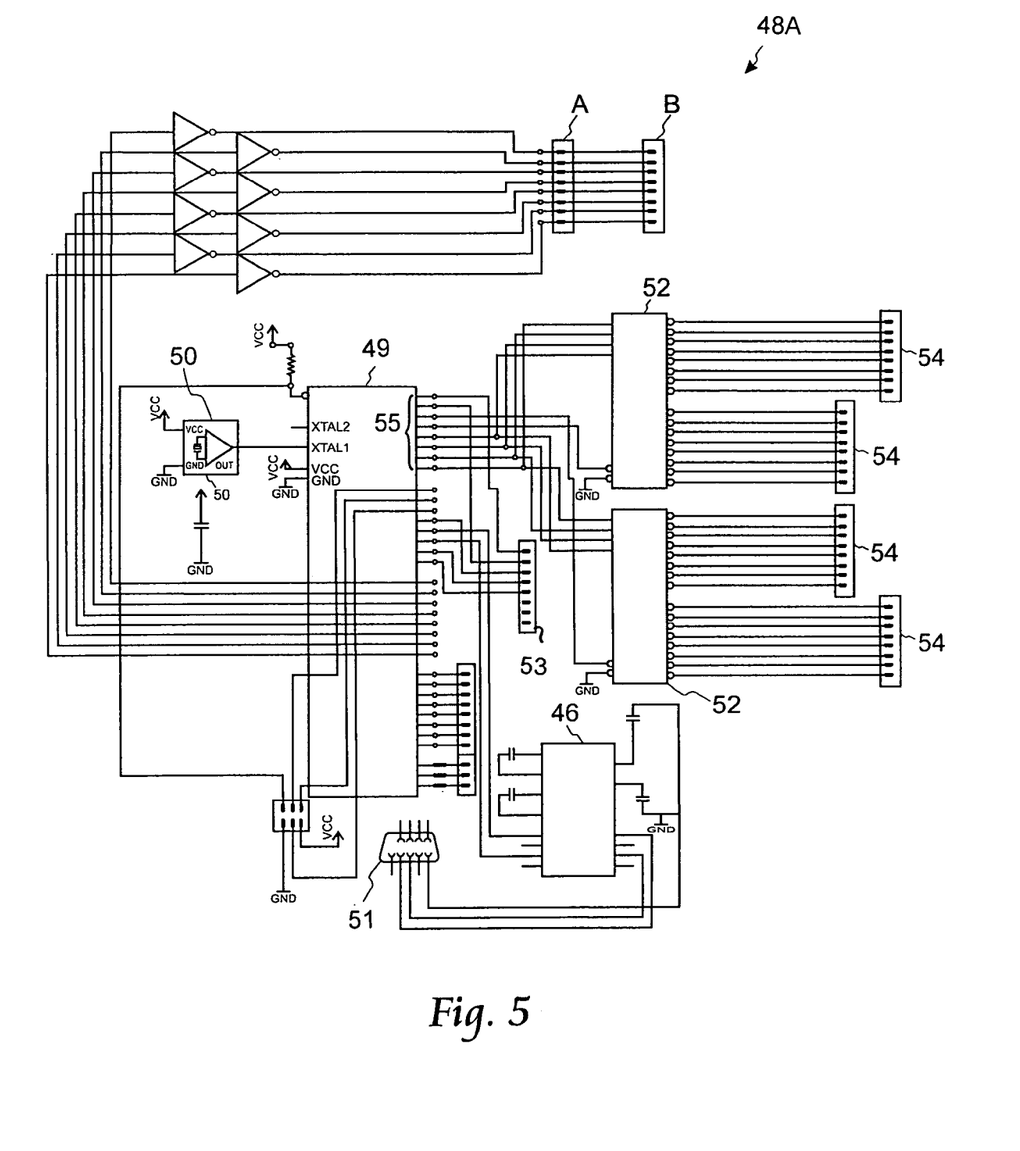
FIG. 5 is a simplified schematic of the digital output slave microprocessor schematic.
Figure 6:
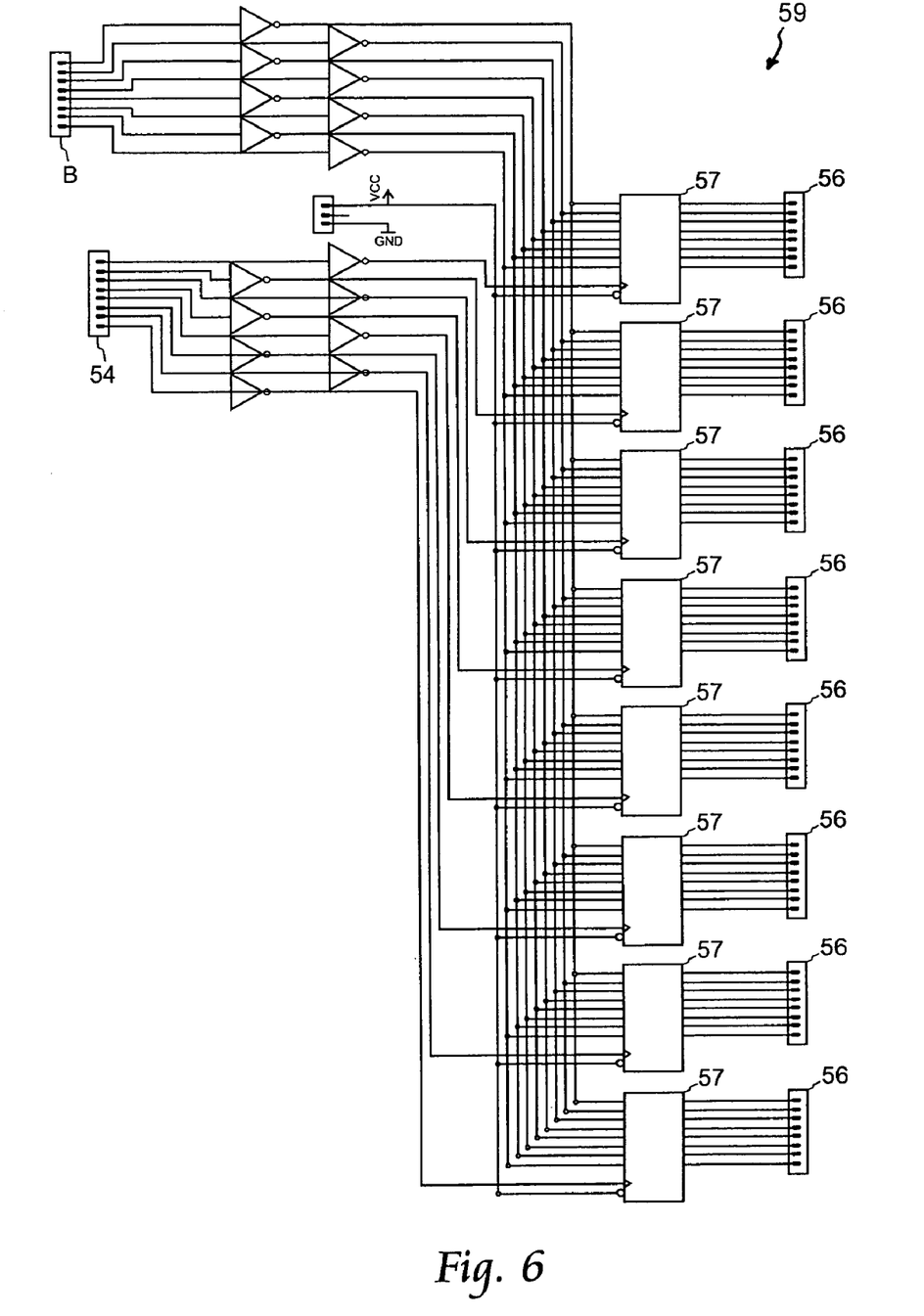
FIG. 6 is a simplified schematic of the digital output board schematic.

Referring now to FIGS. 3 and 5-6, one embodiment of the digital output slave device 48A is shown. The digital output slave device 48A has a slave controller processor 49 which controls operation of the digital output slave 48A via the master controller 42. The slave controller processor 49 has a communication port 51 which is coupled to the pins 42B of the master controller 42. The chip select pins 53 of the slave controller processor 49 are coupled to the corresponding chip select pins 42A on the master controller 42. If the master controller 42 has selected the pin on 42A that is coupled to the slave controller chip select pin 53 then the slave controller processor 49 will enable its communication port 51 and will communicate with the master controller 42 as long as the master controller 42 holds the slaves chip select enabled. In this embodiment, one or more demultiplexers 52 are coupled to the slave controller processor 49. Each demultiplexer 52 will have one or more digital output driver boards 59 coupled thereto. The demultiplexer 52 will enable one and only one pin on a driver board 59 determined by the specific corresponding input to it from the slave controller processor 49. Only one of the two demultiplexers 52 will be enabled at one time. This allows the independent selection of any one of the 32 pins on driver board 54 using only 6 pins 42A. Upon receiving the chip select on 53 from the master controller 42 the digital output slave 48A will enable its communication port 53. The master controller 42 will instruct the slave controller microprocessor 49 which of the pins on the demultiplexers 52 to turn on. The digital output slave 48A will also receive the data from the master controller 42 that is to be passed on to the digital output board 59 through the data ports.

Each digital output driver board 59 is coupled to the digital output slave controller's demultiplexer 52 and connectors A or B from the slave controller microprocessor 49. In the embodiment depicted in FIG. 6, up to four digital output boards may be coupled to each digital output slave controller 54. However, this is given as an example and should not be seen as to limit the scope of the present invention. Each digital output driver board 59 is coupled to a digital output pin on the output ports 56 via a flip flop 57. The flip flop 57 is used to transfer data to the digital output board output pins 56.

In operation, the master controller 42 will enable the digital output slave 48A by sending a chip select output to the slave chip select input 53. The digital output slave 48A will enable its communication port 51 and wait for instructions from the communication port 42B of the master controller 42. Upon receiving and interpreting the commands from the master controller 42, the slave controller microprocessor 49 will send a chip select signal to one demultiplexer 52. In the embodiment depicted in FIG. 5, the slave controller microprocessor 49 sends a four bit binary number via the first set of pins 55. The chip select signal will determine which pin on each digital output port 56 will receive the test signals. Once the chip select signal is sent, the slave controller microprocessor 49 will send test signals via the second set of pins A or B. The test signals will be sent to each digital output port 56 via the flip flop 57. The chip select signal will dictate a specific pin on the digital output port 56 where the signal will be sent. By sending out test signals, the technician using test meters or logic probe can see if a desired component coupled to the digital output port 56 is functioning properly. Thus, the system 10 allows one to troubleshooting and verifying operation of a simulator component other than by installing the component in the simulator.

Figure 7:
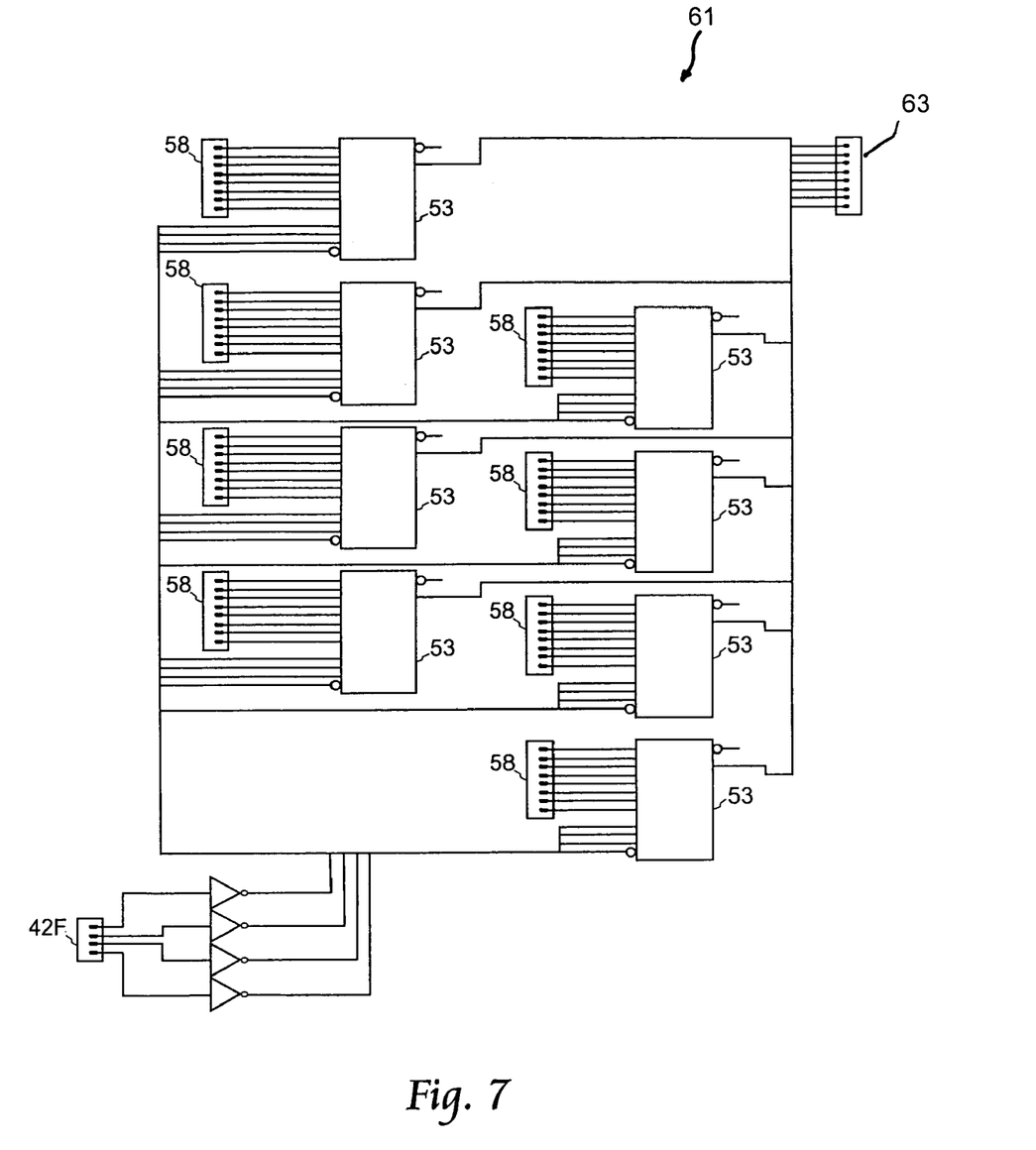
FIG. 7 is a simplified schematic of the digital input board schematic.

Referring now to FIGS. 3 and 7, one embodiment of the master controller 42 with a digital input device 61 is shown. The digital input device 61 will have a plurality of multiplexers 53. An "input select" input port of each multiplexer 53 will be coupled to "input select" output port 42F of the master controller 42. In this embodiment of the present invention, pins 42F are used as chip select pins. In this embodiment, like in the previous embodiment, the master controller 42 sends a three bit binary number as the input select signal. The simulator device under test is connected to the digital input board connector 58. The input select signal will determine which pin on each multiplexer 53 will output the test signals to output pins 63. The output pins 63 of each multiplexer 53 will further be coupled to one of the second set of pins 42B of the master controller 42. However, this is only given as an example and should not be seen as to limit the scope of the present invention.

In operation, the master controller 42 will send an input select signal via the third set of pins 42F. The input select signal will be sent to each multiplexer 53. The master controller 42 will then receive test signals via the second set of pins 42B. However, the input select signal will dictate a specific pin on a specific digital input board 58 where the signal will be sent. By receiving test signals, the master controller 42 can see if a desired component coupled to the digital input device 61 is functioning properly. Thus, the system 10 allows one to troubleshooting and verifying operation of a simulator component other than by installing the component in the simulator.

Figure 8:
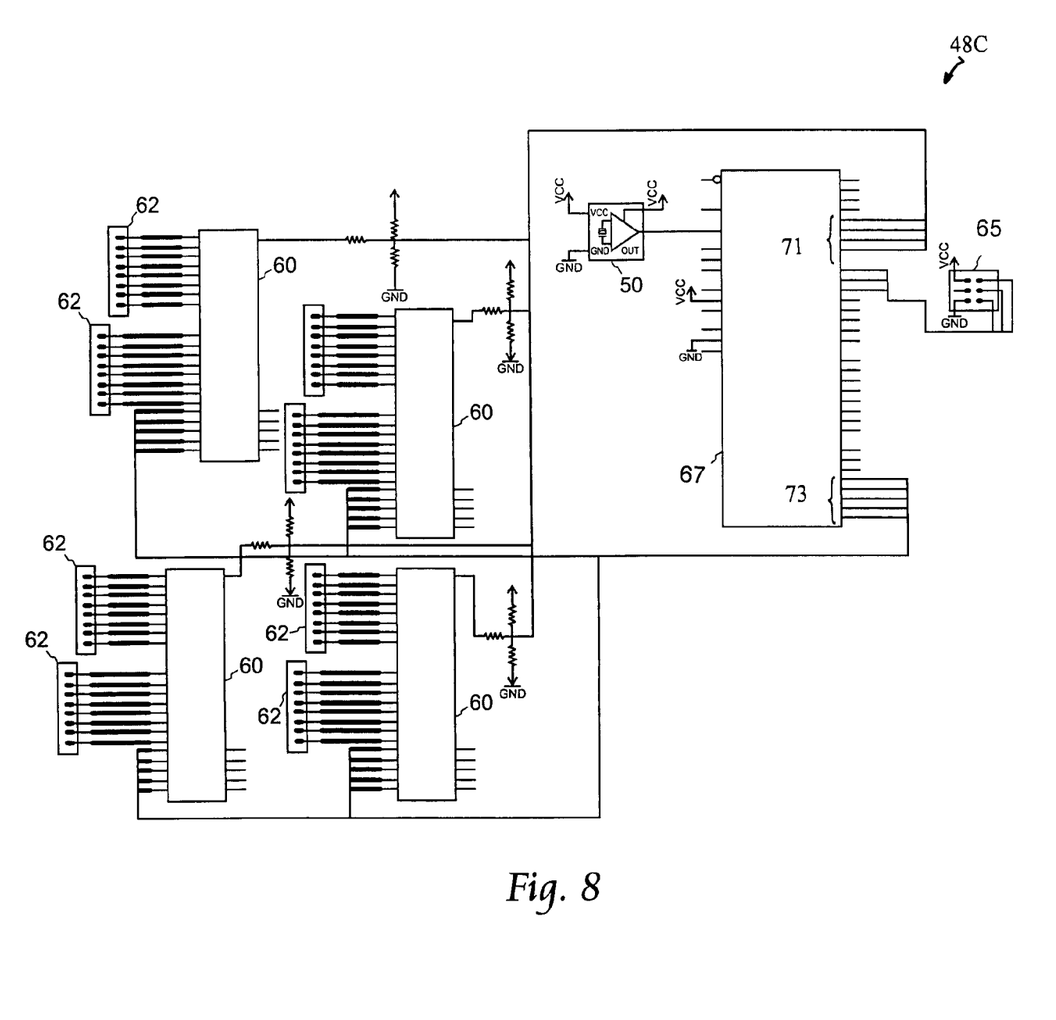
FIG. 8 is a simplified schematic of the analog input slave microprocessor schematic.

Referring now to FIGS. 3 and 8, one embodiment of the master controller 42 with an analog input slave device 48C is shown. The connector 65 of the analog input slave device 48C is an RS-232 interface and connects to the communication bus from the Master Controller 42. The analog input slave device 48C will have a plurality of multiplexers 60. In the embodiment depicted in FIG. 8, the analog input slave device 48C will have four multiplexers 60. This is given as an example and should not be seen as to limit the scope of the present invention. Each multiplexer 60 will be coupled to chip select pins of the analog microcontroller 67. In this embodiment of the present invention a group of pins 73 are used as input select pins. Each multiplexer 60 will further be coupled to set of pins 71 of the analog microcontroller 67. The set of pins 71 are used to transmit and receive data to and from the master controller 42. Each multiplexer 60 will also be coupled to at least one analog input board connector 62 and each pin on the analog input board connector 62 will be connected to an analog simulator device under test. However, this is only given as an example and should not be seen as to limit the scope of the present invention.

In operation, the master controller 42 will send a chip select signal via the pins 73. The chip select signal will determine which pin on the analog input board 48C will be activated and receive the test signals. Once the chip select signal is sent, the analog microcontroller 42 will receive test signals via the pins 71. The test signals will be sent to the master controller 42. However, the chip select signal will dictate a specific pin on the analog input board 62 where the signal will be received. By sending out test signals, the master controller 42 can see if a desired component coupled to the analog input board 62 is functioning properly. Thus, the system 10 allows one to troubleshooting and verifying operation of a simulator component other than by installing the component in the simulator.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A system for testing components of a simulator comprising:
   a digital output slave device;
   a master controller coupled to the digital output slave device, the master controller transmitting chip select and data signals to the digital output slave device for testing a component of the simulator; and
   a computer system coupled to the master controller, the computer system displaying at least one image of a control panel, a cursor of the computer system placed on a desired component on the at least one image of the control panel, a test signal from the computer system sent to the master controller for testing the component of the simulator;
   wherein the digital output slave device comprises:
   a digital output controller coupled to the master controller;
   at least one demultiplexer coupled to chip select pins of the digital output controller; and
   at least one digital output driver board coupled to an output of the demultiplexer and data pins of the digital output controller.

2. A system for testing components of a simulator in accordance with claim 1, further comprising a voltage converter coupled to the master controller and the computer system for converting the test signals from the computer to a proper logic levels for the test circuit.

3. A system for testing components of a simulator in accordance with claim 1, further comprising a differential bus transceiver coupled to the master controller and the computer system for converting commands from the computer system to RS422.

4. A system for testing components of a simulator in accordance with claim 1, wherein the digital output driver board comprises:
   a plurality of flip flops, wherein each flip flop is coupled the at least one demultiplexer and to data pins of the digital output controller;
   a digital output port coupled to the output of each flip flop.

5. A system for testing components of a simulator in accordance with claim 1, wherein the computer system comprises:
   a processing unit for storing the at least one image of the control panel and for sending the test signal to the master controller for testing the component of the simulator;
   a display coupled to the processing unit for showing the at least one image of the control panel; and an I/O device coupled to the processing unit for moving the cursor to the desired component on the at least one image of the control panel and for sending the test signal from the computer system sent to the master controller for testing the component of the simulator.

6. A system for testing components of a simulator comprising:
    a digital input slave device;
    a master controller coupled to the digital input slave device, the master controller transmitting chip select and data signals to the digital input slave device for testing a component of the simulator; and
    a computer system coupled to the master controller, the computer system displaying at least one image of a control panel, a cursor of the computer system placed on a desired component on the at least one image of the control panel, a test signal from the computer system sent to the master controller for testing the component of the simulator;
    wherein the digital input slave device comprises:
    a plurality of multiplexers having inputs coupled to chip select pins and data pins of the master controller; and
    a digital input board coupled to an output each of the at least one multiplexer.

7. A system for testing components of a simulator comprising:
    an analog input slave device;
    a master controller coupled to the analog input slave device, the master controller transmitting chip select and data signals to the analog input slave device for testing a component of the simulator; and
    a computer system coupled to the master controller, the computer system displaying at least one image of a control panel, a cursor of the computer system placed on a desired component on the at least one image of the control panel, a test signal from the computer system sent to the master controller for testing the component of the simulator;
    wherein the analog input slave device comprises:
    an analog input controller coupled to the master controller;
    at least one multiplexer having inputs coupled to chip select pins and data pins of the analog input controller; and
    at least one analog input board connector coupled to an output of the at least one multiplexer.

8. A system for testing components of a simulator comprising:
    a slave device;
    a master controller coupled to the slave device, the master controller transmitting chip select and data signals to the slave device for testing a component of the simulator; and
    a computer system coupled to the master controller, the computer system displaying at least one image of a control panel, a cursor of the computer system placed on a desired component on the at least one image of the control panel, a test signal from the computer system sent to the master controller for testing the component of the simulator;
    wherein said slave device comprises:
    signal transferring device coupled to the master controller for transferring the chip select and data signals from the master controller; and
    at least one I/O board coupled to the signal transferring device for receiving the chip select and data signals.

9. A system for testing components of a simulator in accordance with claim 8, wherein the signal transferring device comprises:
    a digital output controller coupled to the master controller;
    at least one demultiplexer coupled to chip select pins of the digital output controller; and
    at least one digital output driver board coupled to an output of the demultiplexer and data pins of the digital output controller.

10. A system for testing components of a simulator in accordance with claim 9, wherein the digital output driver board comprises:
    a plurality of flip flops, wherein each flip flop is coupled the at least one demultiplexer and to data pins of the digital output controller;
    a digital output port coupled to the output of each flip flop.

11. A system for testing components of a simulator in accordance with claim 8, wherein the signal transferring device comprises:
    a plurality of multiplexers having inputs coupled to chip select pins and data pins of the master controller; and
    a digital input board coupled to an output each of the at least one multiplexer.

12. A system for testing components of a simulator in accordance with claim 8, wherein the signal transferring device comprises:
    an analog input controller coupled to the master controller;
    at least one multiplexer having inputs coupled to chip select pins and data pins of the analog input controller; and
    at least one analog input board connector coupled to an output of the at least one multiplexer.

13. A system for testing components of a simulator in accordance with claim 8, wherein the signal transferring device comprises analog output device.

* * * * *